United States Patent [19]

Gerlitz et al.

[11] Patent Number: 4,990,899
[45] Date of Patent: Feb. 5, 1991

[54] MOTORCYCLE DATA DISPLAY APPARATUS

[75] Inventors: Yonatan Gerlitz, Herzliya; Dan Moran, Ramat Gan, both of Israel

[73] Assignee: Rasaat, Ramat Gan, Israel

[21] Appl. No.: 334,548

[22] Filed: Apr. 7, 1989

[30] Foreign Application Priority Data

Apr. 7, 1988 [IL] Israel ......................................... 86001

[51] Int. Cl.⁵ ............................................. G02B 27/10
[52] U.S. Cl. ...................................... 340/705; 180/219
[58] Field of Search ........................ 340/705, 753, 980; 180/219; 350/174

[56] References Cited

U.S. PATENT DOCUMENTS

| | | | |
|---|---|---|---|
| 3,787,109 | 1/1974 | Vizenor | 350/174 |
| 3,833,300 | 9/1974 | Rymes . | |
| 4,156,292 | 5/1979 | Helm et al. | 340/705 |
| 4,398,799 | 8/1983 | Swift | 340/705 |
| 4,468,101 | 8/1984 | Ellis | 350/174 |
| 4,652,870 | 3/1987 | Steward | 340/705 |
| 4,687,072 | 8/1987 | Komuro | 340/705 |
| 4,740,780 | 4/1988 | Brown et al. | 350/174 |
| 4,755,023 | 7/1988 | Evans et al. | 350/174 |
| 4,818,048 | 4/1989 | Moss | 350/174 |
| 4,842,389 | 6/1989 | Wood et al. | 350/174 |
| 4,869,575 | 9/1989 | Kubik | 350/174 |
| 4,878,046 | 10/1989 | Smith | 340/705 |

FOREIGN PATENT DOCUMENTS

| | | |
|---|---|---|
| 0216692 | 4/1987 | European Pat. Off. . |
| 0288365 | 10/1988 | European Pat. Off. . |
| 60-88925 | 5/1985 | Japan . |
| 61-12450 | 1/1986 | Japan . |

Primary Examiner—Jeffery A. Brier
Attorney, Agent, or Firm—Wenderoth, Lind & Ponack

[57] ABSTRACT

Motorcycle visual display apparatus comprising signal processing apparatus having an input associated with the motorcycle instruments, a visual display surface positioned in the motorcycly rider's instantaneous field of view and a visual display assembly for receiving output data from the signal processing apparatus and for projecting the data onto the visual display surface.

4 Claims, 6 Drawing Sheets

4,990,899

MOTORCYCLE DATA DISPLAY APPARATUS

FIELD OF THE INVENTION

The present invention relates to motorcycle data display apparatus.

BACKGROUND OF THE INVENTION

Motorcycle display panels, which display to a rider real time driving information such as velocity and the RPM of the motor and are conventionally not located in the instantaneous field of view of the rider and may, therefore, constitute a hazard to the rider and to other road users in his vicinity.

The hazard emanates from the rider having to move his line of sight from the road, to the display panel and back again to the road in order to look at the display panel. This movement not only constitutes a distraction, but it also causes the rider's eyes to have to refocus from a substantially infinite conjugate ratio, to a short distance focus and back to the infinite conjugate ratio. In the relatively short time that the refocussing may take, a road accident can occur.

Furthermore, in bad weather conditions, such as heavy rain, snow and fog, the display panel may be very difficult, if not impossible, to read.

SUMMARY OF THE INVENTION

It is an aim of the present invention to provide motorcycle display apparatus that provides a visual display to a rider in his instantaneous field of view so as to provide information to him without necessitating his taking his eyes off the road or his eyes having to refocus to read the information displayed by the apparatus.

There is provided, therefore, in accordance with an embodiment of the invention, motorcycle visual display apparatus comprising signal processing apparatus having an input associated with the motorcycle instruments, a visual display surface positioned in the motorcycle rider's instantaneous field of view and a visual display assembly for receiving output data from the signal processing apparatus and for projecting the data onto the visual display surface.

Additionally in accordance with an embodiment of the invention, the visual display surface is a partially light-reflective, curved surface having a predetermined optical configuration.

Further in accordance with an embodiment of the invention, the partially light-reflective, curved surface comprises a partially light-reflective coating on a generally transparent curved substrate.

Additionally in accordance with an embodiment of the invention, the visual display assembly comprises a light source located at a predetermined position relative to the focus of the partially light-reflective, curved surface.

In accordance with one embodiment of the invention, the visual display surface comprises a portion of the motorcycle windshield.

In accordance with an alternative embodiment of the invention, the visual display surface comprises a portion of an item of headgear worn by the rider.

BRIEF DESCRIPTION OF THE DRAWINGS

The present invention will be understood and appreciated more fully from the following detailed description taken in conjunction with the drawings, in which.

DETAILED DESCRIPTION OF A PREFERRED EMBODIMENT

Figure 1:
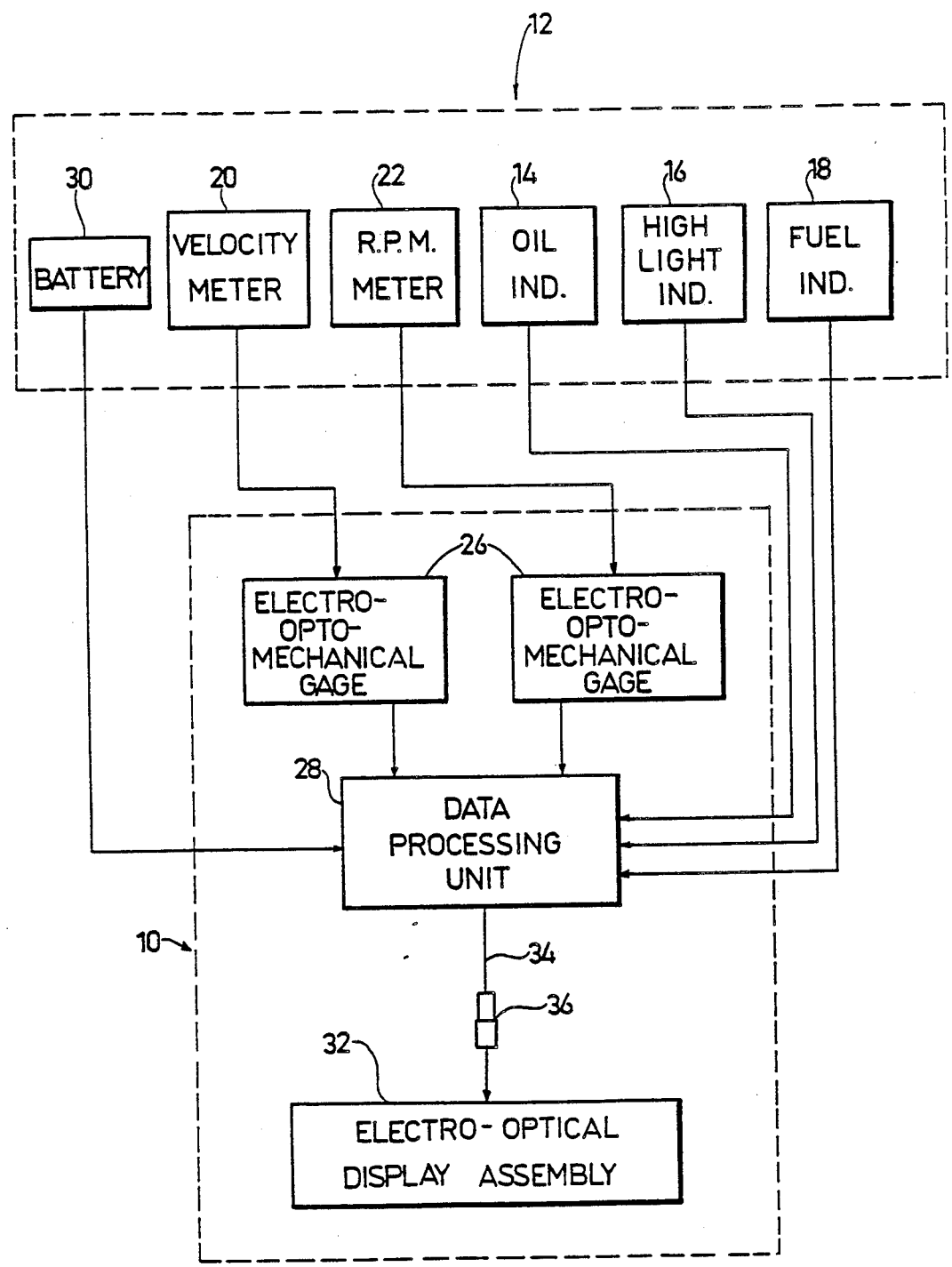
FIG. 1 is a block diagram illustration of motorcycle data display apparatus, constructed and operative in accordance with a preferred embodiment of the present invention.

Reference is made to FIG. 1 which shows in block diagram form, motorcycle data display apparatus, referenced generally 10, constructed and operative in accordance with a preferred embodiment of the invention. Apparatus 10 interfaces with a motorcycle 12 via electrical connections passing input signals from an oil indicator 14, a high light indicator 16 and a fuel indicator 18. Data from velocity and RPM gauges, respectively referenced 20 and 22, is generated via electro-opto-mechanical transducers 26, which transmit signals to a data processing unit (DPU) 28. Appartus 10 is typically powered by the motorcycle battery, shown at 30, through unit 28.

DPU 28 is operative to process the input signals and provides an output to a display assembly 32 in the form of data signals as described below with reference to FIGS. 2 and 3. Display assembly 32 displays the data to a rider in his instantaneous field of view and in infinite conjugate ration to his eye. Assembly 32 is preferably connected to DPU 28 via an electrical cable 34 in which there may be provided a quick release connector 36.

Figure 2:
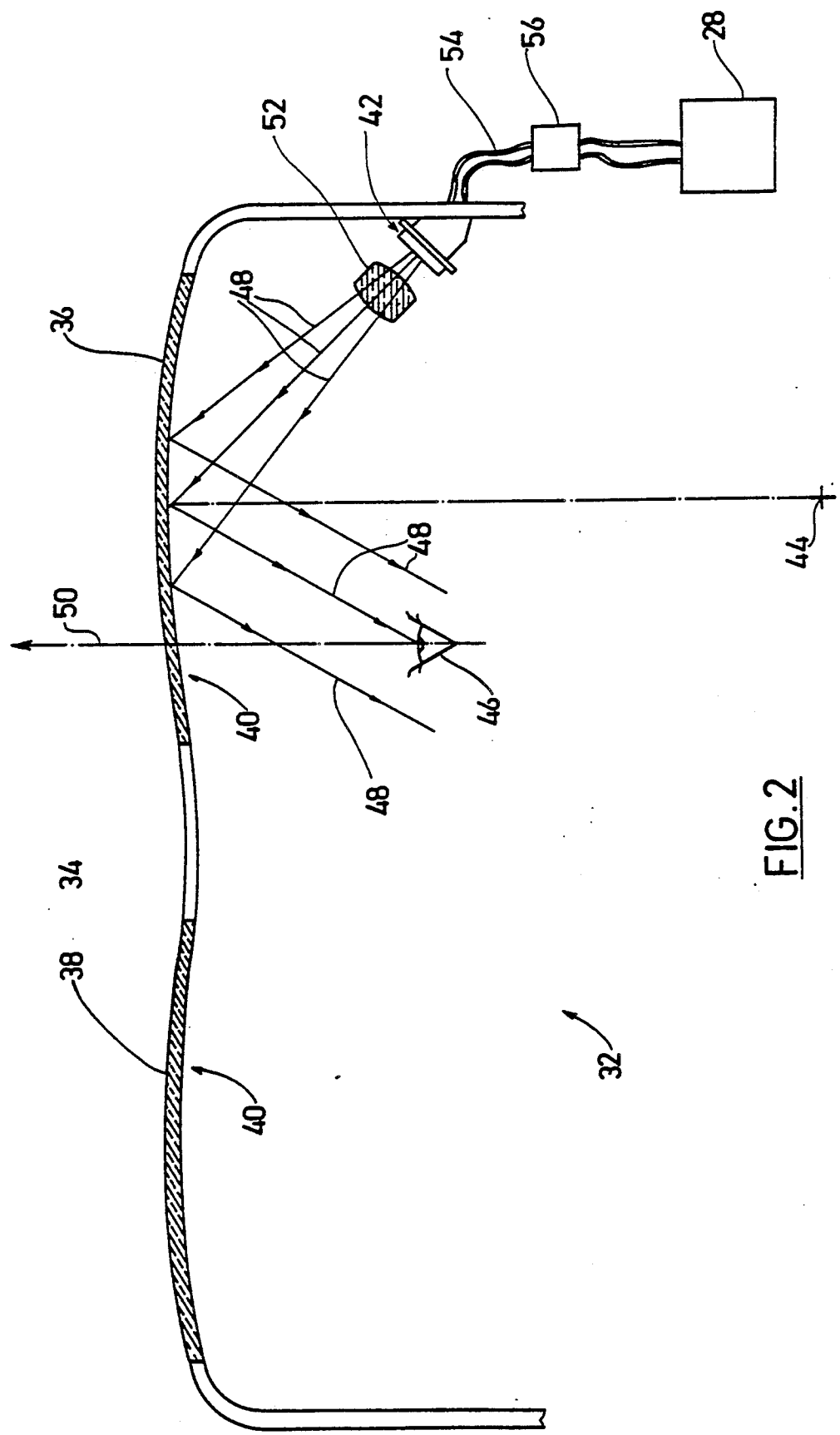
FIG. 2 is a schematic illustration of a visual display assembly and surface forming part of the apparatus of FIG. 1.

Reference is now made to FIG. 2 which shows, in schematic fashion, display assembly 32 in a preferred configuration. According to one embodiment of the invention, assembly 32 comprises a portion of a motorcycle windshield shown at 34. Although the invention is described below with respect to a motorcycle windshield, according to an alternative embodiment, assembly 32 may comprise a portion of a visor of a crash helmet.

Windshield 34 is formed of a light transmissive, relatively stiff material, such as a polycarbonate and, at curved display areas 36 and 38, has predetermined geometrical configurations. Areas 36 and 38 are respectively located in the optically active fields of the right and left eyes of the rider. According to a preferred embodiment of the invention display areas 36 and 38 each describe a portion of a sphere, although any other suitable geometric configuration, such as parabolic, may also be used.

Inward-facing surfaces 40 of areas 36 and 38 have a partially light transmissive coating of, for example, a neutral metallic coating or a dichroic type coating such as manufactured by Denton Vacuum, of Cherry Hill, N.J. Relating now particularly to one side of the shown apparatus, according to a preferred embodiment, a horizontal plane in which lies the biggest circle of the sphere partially defined by area 36 arranged such that the rider's line of sight, when looking straight ahead, lies therein. A display unit 42 also preferably lied in this plane.

According to the shown view, the center of the sphere, shown at 44, is, according to the shown embodiment, located to the right of the right eye, shown at 46. Display unit 42 is located to the right of the largest vertical circle defined by the sphere.

Rays of light, referenced 48, that are projected from display unit 42 are reflected from surface 40 to the eye in substantially parallel fashion and at an angle of about 15 degrees from the central line of sight 50 of the eye.

An image formed by a plurality of rays of light reflected from surface 40 as described is thus perceived by the rider to have emanated from infinity and it appears in his instantaneous field of view, but not in the center thereof.

Although the display assembly has been described solely with reference to area 36, according to an additional embodiment of the invention, a display unit, similar to unit 42, may be provided so as to provide motorcycle data to area 38 either in addition or as an alternative to the data provided to area 36.

It will be appreciated by persons skilled in the art that in an alternative embodiment of the invention, the image may be projected onto surface 40 such that it appears above the central line of sight and not at the side thereof as described.

There may also be provided a corrective optical element 52 through which rays of light 48 pass before being reflected from surface 40. Element 52 shall mainly be used for correcting astigmatism and may be, for example, a cylindrical or prismatic lens.

According to a preferred embodiment of the invention, display unit 42 is a high intensity dot matrix display such as an HDSP.2002 manufactured by Hewlett Packard. Alternatively, unit 42 may comprise a high intensity miniature seven or sixteen segment display, such as a Hewlett Packard HPDL-1414, or a transparent LCD with a light source. Display unit 42 is preferably connected by means of electrical cable 54 to DPU 28 via a quick release connector 56.

Figure 3:
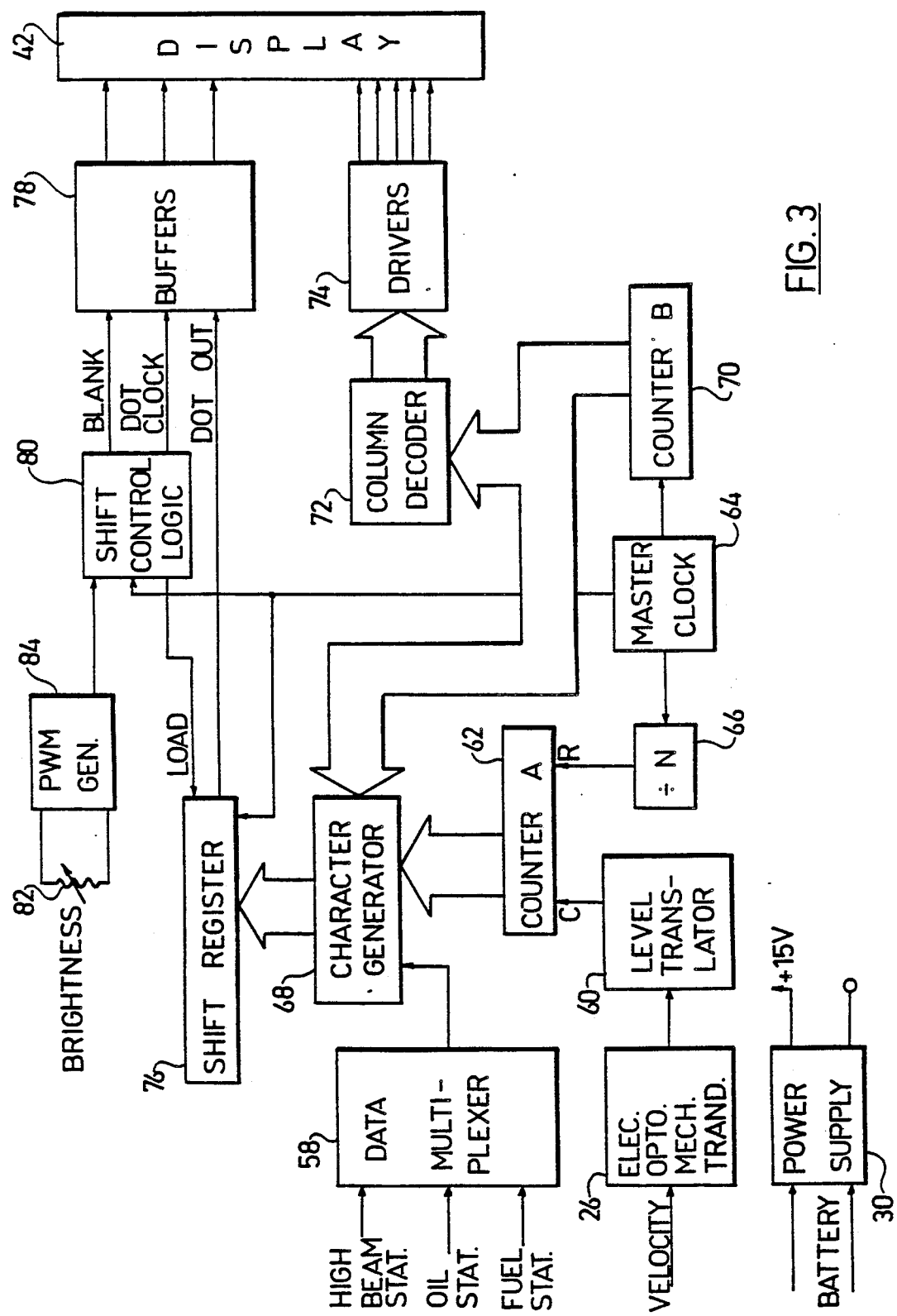
FIG. 3 is a block diagram illustration of electronic circuitry useful in data processing apparatus forming part of the apparatus of FIG. 1.

Reference is now made to FIG. 3 which is a block diagram illustration of electronic circuity useful in DPU 28 which. According to the shown embodiment, display unit 42 comprises a dot matrix display with at least four characters of 5 ×7 dots.

Indications of high beam, oil and fuel, in the form of electrical signals, are provided as input to a data multiplexer and control logic unit 58. Unit 58 is operative to amplify the signals and by OR logic unit 58 provides an output which indicates if there is any problem in one or more of the indicators.

Velocity pulses are provided by the electro-optomechanical transducer 26 to a level translator 60 and are thereafter provided to a counter 62. Counter 62 is controlled by a master clock 64 by means of a divider 66 so that the output from the counter is in the form of a binary number that is a direct indication of the velocity.

The outputs of counter 62 and unit 58 are provided as input to a character generator 68 which is effective to translate the input into an output format suitable for provision to display unit 42.

A counter 70 controls character generator 68 and at the same time synchronizes a column decoder 72 that controls, through drivers 74, which of the five columns in each of the characters is to receive the output from the character generator 68.

Each of the five columns that constitute display unit 42 is made up of 7 dots×4 characters=28 bits. The output from character generator 68 for each column is stored in a shift register 76. The output of shift register 76 to display unit 42 is synchronized by master clock 64 through buffers 78. Master clock 64 also synchronizes shift control logic 80 which provides dot clock and also provides blank signal to display 42 via buffers 78.

The light intensity of the display is controlled by a potentiometer 82 governed by the motorcycle rider and by a PWM generator 84 which controls the duty cycle of the blinking signal of shift control logic 80 and so changes the average brightness of the display.

Figure 6:
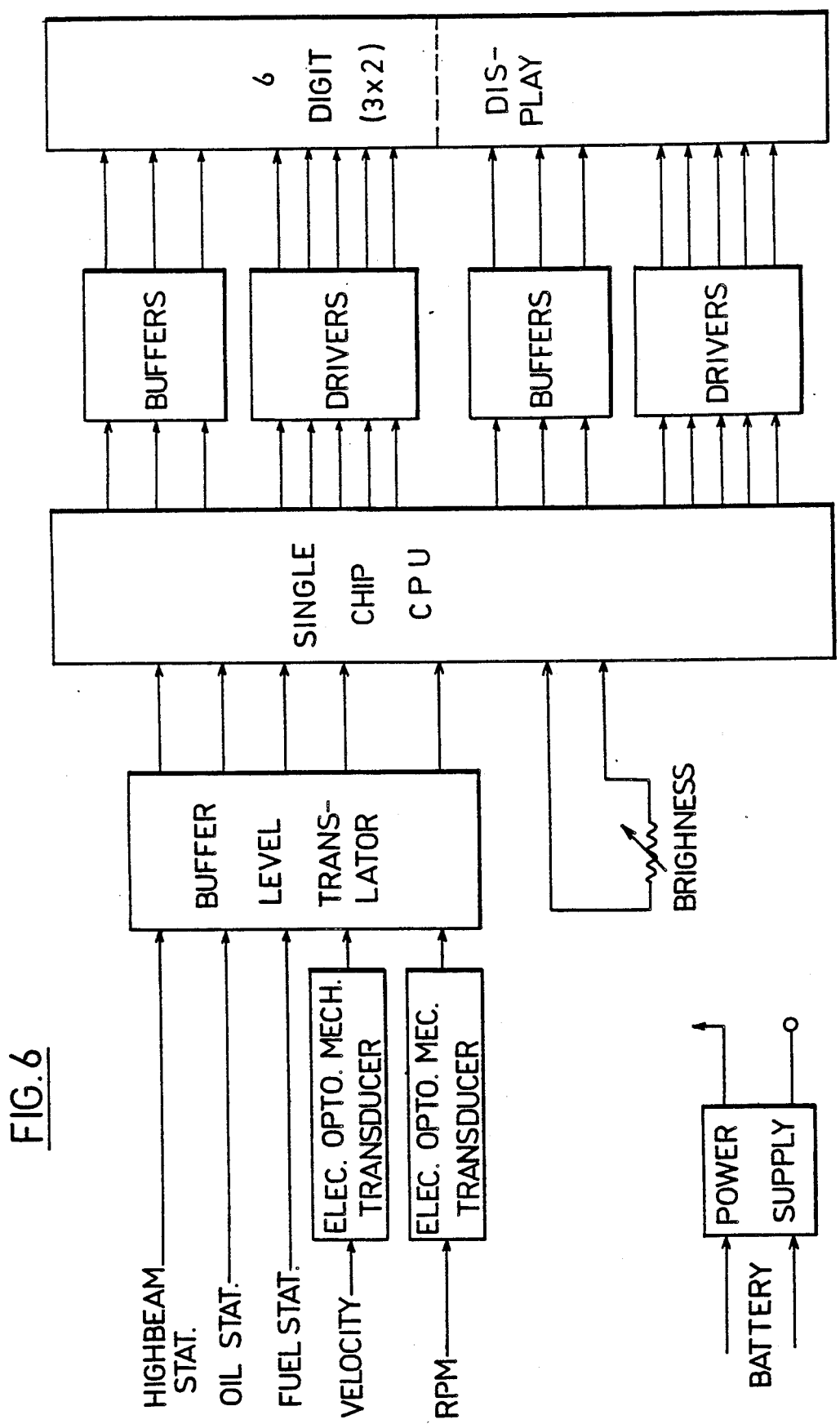
FIG. 6 is a block diagram illustration of alternative electronic circuitry useful in data processing apparatus forming part of the apparatus of FIG. 1.

With reference to FIG. 6, it is seen that alternatively the system may be implemented by employing a single chip CPU, this embodiment being in other respects similar or identical to that illustrated in FIG. 3.

Figure 4:
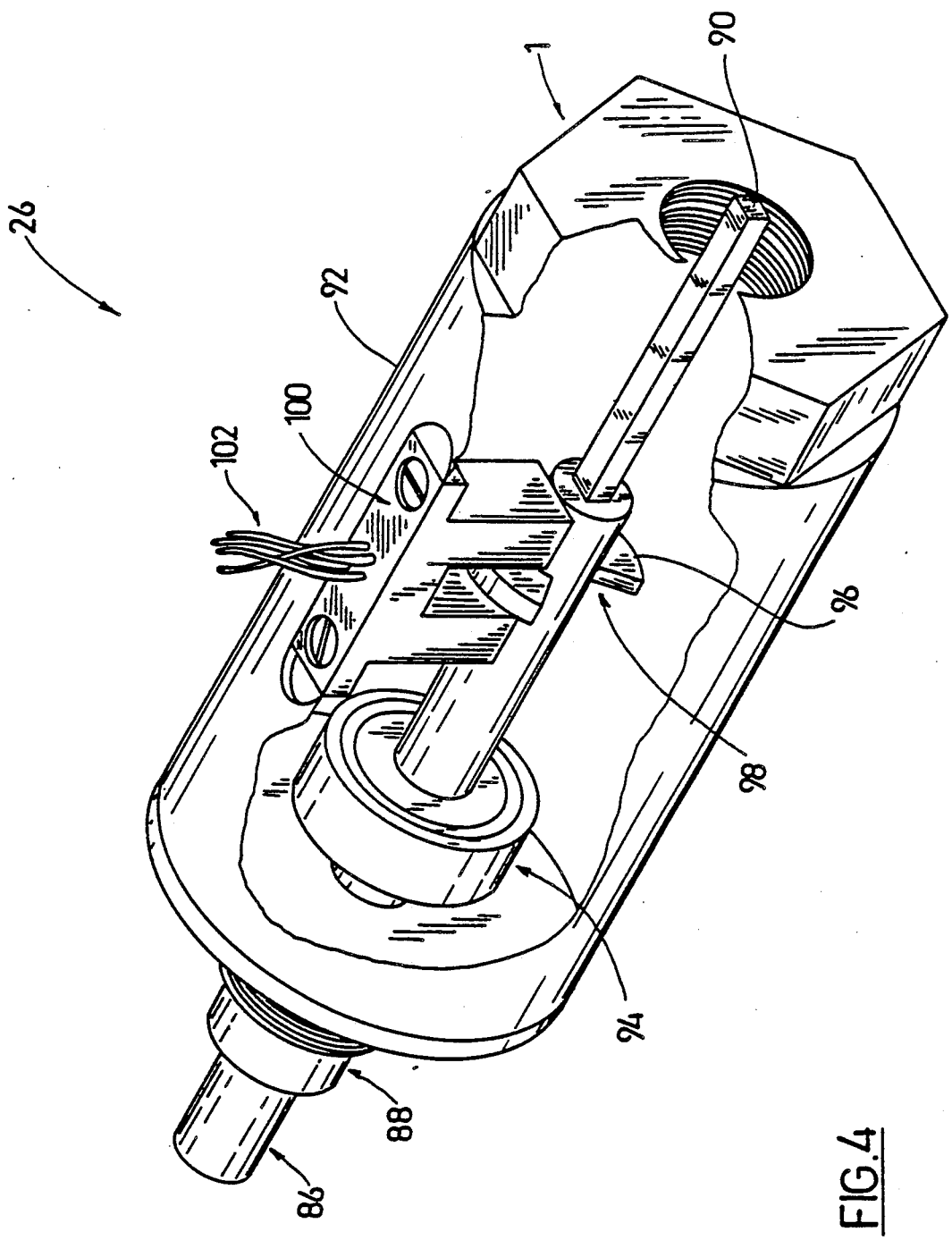
FIG. 4 is an illustration of an interface transducer element useful in the apparatus of FIG. 1.

Reference is now made to FIG. 4 which is an ilustration of electro-opto-mechanical interface transducer 26 (also shown in FIGS. 1 and 3) used for transforming velocity and motor RPM into electrical signals.

Transducer 26 comprises a rotary shaft 86 which is mechanically connected at a location 88 to an end of the motorcycle speedometer cable (not shown). Shaft 86 is further connected, at an end 90 thereof to a speedometer (not shown). Shaft 86 is mounted within transducer housing 92 by means of a bearing 94.

A slotted disk 96 is mounted onto shaft 86 and is rotatable together therewith. As the disk is rotated, a slit 98 defined thereby, passes through an optical switch 100, which, for example, may be MOC75T1 manufactured by Motorola. Optical switch 100 includes an infrared emitting diode located to one side of disk 96 and an infrared detector on the other side thereof.

As the disk is rotated and passes through the infrared emission, a pulsed signal is detected by the infrared detector. Each turn, therefore, of the speedometer cable, which is turn causes a corresponding turn of shaft 86 and disk 96, causes an electrical pulse to be transmitted from optical switch 100, through a connection 102, to DPU 28.

Figure 5:
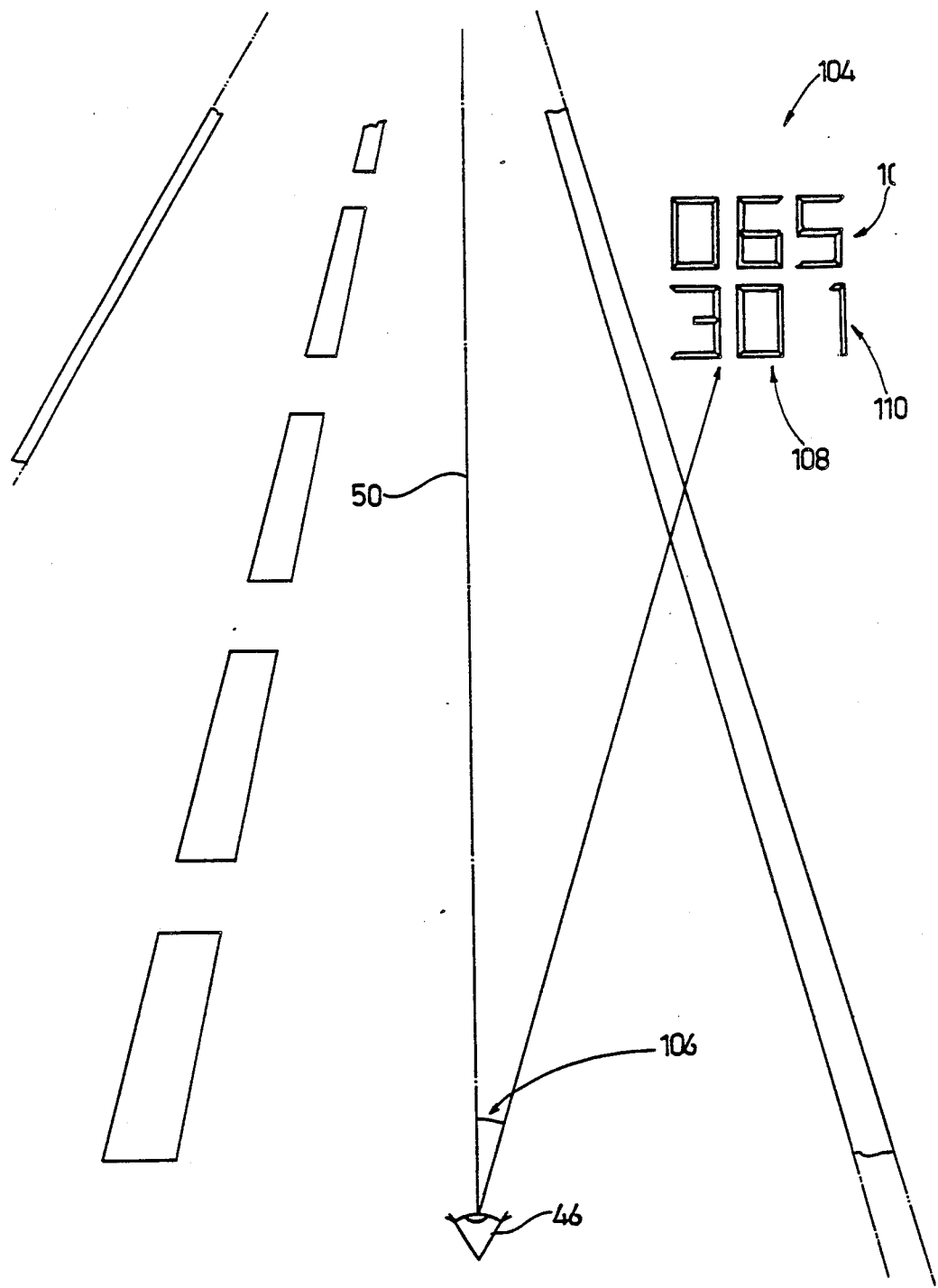
FIG. 5 is a schematic illustration of a motorcycle rider's instantaneous field of view including motorcycle data as displayed by visual display apparatus shown in FIG. 1.

Reference is now made to FIG. 5 which is a schematic illustration of a motorcycle rider's instantaneous field of view including motorcycle data as displayed by the display apparatus of the present invention. The line of sight 50 is taken to be in the direction of travel of the motorcycle. Superimposed onto a portion of a visor or a windshield (not shown) is display data, shown generally at 104. As described above in conjunction with FIG. 2, the data is displayed to one side of the field of view, typically at an angle 106 of about 15 degrees from line of sight 50.

The display data is perceived by the eye to be floating in infinite conjugate ratio thereto. Sample display data shown in FIG. 5 includes a velocity of 65 Km/h shown at 106 and a motor RPM of 30×100 shown at 108. A warning signal in the form of a blinking exclamation mark is shown at 110. The velocity and RPM indications are shown in 7 segment format, while the warning signal is shown in special LED configuration.

It will be appreciated by persons skilled in the art that the present invention is not limited by what has been shown and described hereinabove. The invention is limited, rather, solely by the claims, which follow:

We claim:

1. Motorcycle visual display apparatus for use with a motorcycle having first display instruments indicating operating parameters such as speed and motor RPM comprising:

signal processing means having an input associated with the motorcycle instruments, a motorcycle rider's crash helmet having a second instrument means including a transparent element having a curved portion;

a visual display surface positioned on said curved portion of said transparent element in the motorcycle rider's instantaneous field of view, said visual display surface being formed by a dichroic type coating formed on the inward facing surface of said curved portion, causing said curved portion to be reflective for a given wavelength bank of light, and visual display means having a solid state light source for receiving output data from said signal processing means and for projecting said data onto said visual display surface within said given wavelength band of light, thereby to cause said data to be reflected to the eyes of the motorcycle rider and to be perceived by the motorcycle rider as if it appeared from infinity.

2. Motorcycle visual display apparatus according to claim 1 and also comprising quick release electrical connector apparatus interconnecting said signal processing means and said visual display means.

3. Motorcycle visual display apparatus according to claim 1 wherein the inward facing surface of said curved portion of said element has a spherical curvature and lies directly in the rider's line of sight without any intervening object being present.

4. Motorcycle visual display apparatus according to claim 1 and also comprising means for correcting astigmatism disposed along the optical path between said solid state visual display means and said curved surface.

* * * * *